United States Patent

[11] 3,577,130

| [72] | Inventors | Rex Rice<br>Menlo Park;<br>Gilman D. Chesley, Los Altos; William R.<br>Smith, Mountain View, Calif. |
|---|---|---|
| [21] | Appl. No. | 863,454 |
| [22] | Filed | Oct. 3, 1969 |
| [45] | Patented | May 4, 1971 |
| [73] | Assignee | Fairchild Camera and Instrument<br>Corporation<br>Mt. View, Calif. |

[54] MEANS FOR LIMITING FIELD LENGTH OF COMPUTED DATA
2 Claims, 4 Drawing Figs.

| [52] | U.S. Cl. | 340/172.5 |
|---|---|---|
| [51] | Int. Cl. | G06f 7/00 |
| [50] | Field of Search | 235/157;<br>340/172.5 |

[56] References Cited
UNITED STATES PATENTS

| 3,161,763 | 12/1964 | Glaser | 235/157 |
|---|---|---|---|
| 3,219,982 | 11/1965 | Tucker | 340/172.5 |
| 3,299,410 | 1/1967 | Evans | 340/172.5 |
| 3,434,114 | 3/1969 | Arulpragasam | 340/172.5 |
| 3,448,436 | 6/1969 | Machol | 340/172.5 |

*Primary Examiner*—Paul J. Henon
*Assistant Examiner*—R.F. Chapuran
*Attorneys*—Roger S. Borovoy and Alan H. MacPherson

ABSTRACT: Limit hardware for controlling the field length of resultant data produced by a data processor including a limit register, a counter and a comparator. The limit register is loaded with any desired number representing the desired number of fields of the resultant data, while the counter is incremented as each field of resultant data is produced by the processor. When the contents of the limit register and the counter are equal, data processing is terminated and the desired number of resultant data produced by the processor is supplied to any appropriate user, before a new processing operation is initiated.

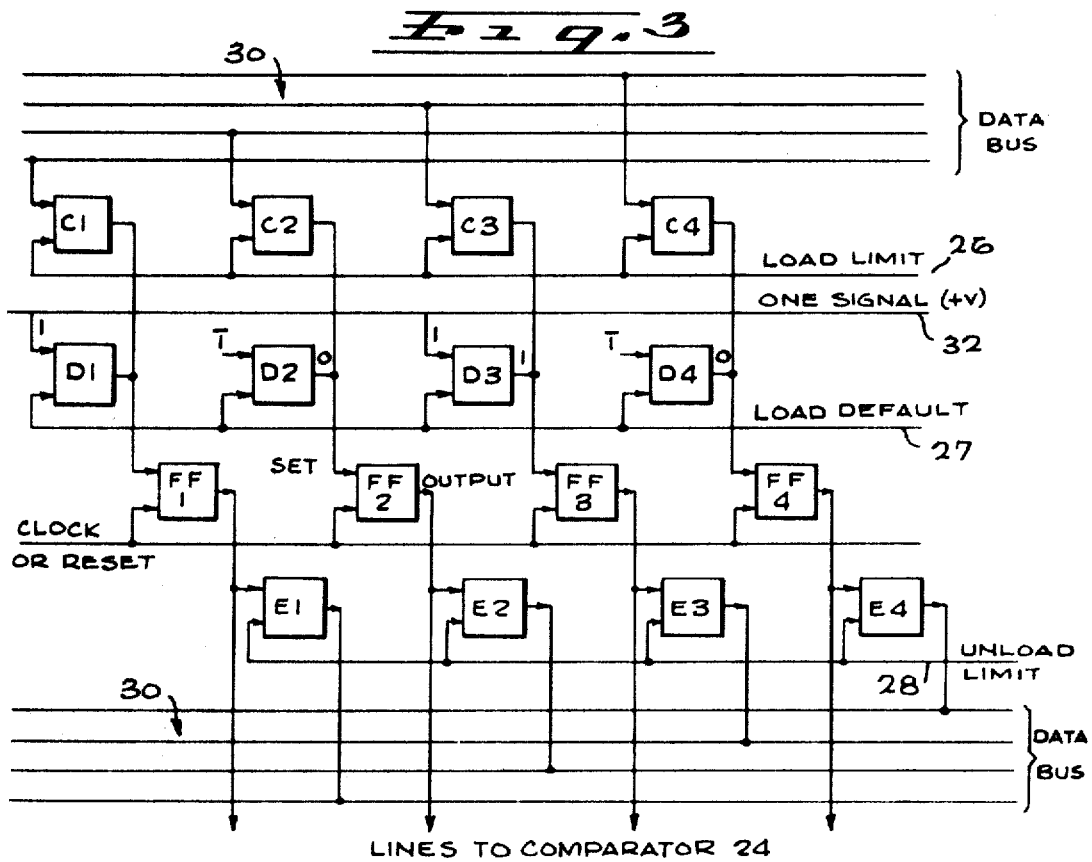
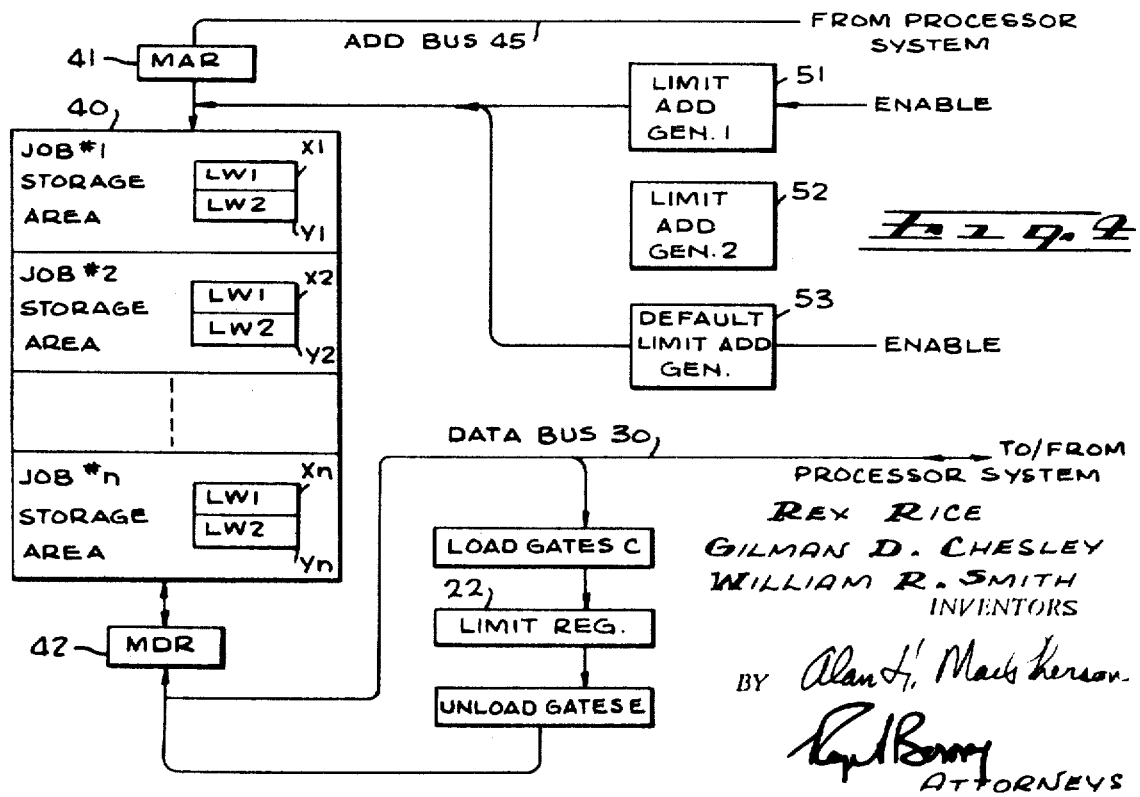

MEANS FOR LIMITING FIELD LENGTH OF COMPUTED DATA

BACKGROUND OF THE INVENTION

1. Field of the Invention

This invention generally relates to improved circuit arrangements in a variable field length processing system.

2. Description of the Prior Art

In various data processing techniques, it is often desirable to limit the length and accuracy of resultant data, produced from processed data, to be a function of the length and accuracy of such processed data. For example, when dividing 1 by 3, the resultant is 0.333, followed by an infinite chain of 3's. Clearly, in such a case it may be desired to limit the processing so that the resultant data does not exceed a desired length. Similarly, when multiplying two numbers, each of $n$ digits, the unlimited resultant number may be $2n$ digits long. Assuming that the desired accuracy is defined by the $n$ digit length of each processed number, producing a resultant number, which is longer than $n$ digits, is unnecessary since it does not increase the overall accuracy of the processed data.

Performing processing operations which result in the production of resultant data longer than necessary is wasteful of time and, therefore, very undesirable, particularly in processing systems, wherein processing time is of primary importance. The problems of limiting the length of resultant data is particularly significant in variable field length (VFL) processing operations. In such operations data of different lengths and degrees of accuracy may be processed. Therein, it is most significant to be able to limit the processing, with the highest degree of flexibility, in order to insure that processing time is not wasted. This is accomplishable by limiting processing to produce resultant data which does not exceed a length which will achieve the desired accuracy. In some prior art processing systems, the length of any resultant data is fixedly limited not to exceed one or more predetermined unalterable values.

When a VFL processing capability is incorporated in a multiprocessor system, of the type capable of performing processing jobs, requested by different sources, where each job may involve processing operations of several different processors of the system, it would be very advantageous to be able to vary the lengths of the resultant data, produced by each processor for any particular job, as a function of the job's required accuracy. Such a capability would enable the system to perform, or execute, each job in optimum time, since for each processor or job, processing time would be limited to that required to produce resultant data with an accuracy which does not exceed the required accuracy.

Processing time may further be optimized by enabling the system to vary the length limit, placed on the resultant data of any processor, as speedily as possible, in order to enable the same processor to perform its task on different jobs which require resultant data of different lengths. In order to provide maximum system flexibility it is desirable to be able to limit the outputs of the various processors during initial program checkout to one or more than one different limits, thereby enabling one to checkout the program with different degrees of processing accuracy.

The system's capability would further be enhanced by enabling the limit variable to be used by the system as a system variable on which processing may take place. This would enable one to optimize the needed limit for any processing job, performed by the system. Clearly, it is desired that limit variable changes or their use as system variables be achieved in a minimum of time to minimize the time during which the system performs functions other than actual processing operations. Also, the system should provide for a default limit value when the user is not concerned with accuracy or processing efficiency.

Although several techniques have been developed in the prior art to limit the length of resultant data, none of these techniques are capable of providing the above-mentioned advantages or capabilities. In some prior art systems, the resultant data from a processor is placed in a single or double precision resultant register. Based on special instructions, the resultant data in a portion of the register, representing a single precision value and in the entire register, representing another precision value, are operated upon to provide resultant data of a desired length. In other systems, the resultant data is entered into a resultant register. Thereafter a special purpose instruction is executed which refers to a word containing a truncation value. Based on the word content, the length of the resultant data is limited or truncated. Clearly, such an operation is time consuming since it involves the retrieval of a truncation word and the execution of a data limiting or truncation instruction as a function of the word content. Thus, a need exists for a new circuit arrangement or technique for limiting resultant data of processors so as to achieve the aforementioned advantageous characteristics.

OBJECTS AND SUMMARY OF THE INVENTION

It is a primary object of the present invention to provide a new improved arrangement for limiting the length of resultant data from a processor.

Another object is to provide a new circuit arrangement in a processing system whereby the length of resultant data from a processor may be varied in optimum time.

A further object of the invention is to provide a circuit arrangement for use in a processing system to enable optimum flexibility in truncating the resultant data of any processor in the system and to enable the use of the length limit as a system variable.

These and other objects of the invention are achieved by providing a special purpose circuit arrangement in the form of actual logic circuitry, hereafter referred to as the limit hardware, for each processor, whose resultant data may be subject to length limitation. The limit hardware includes a limit register which is easily loaded with a limit number, representing the length of the desired resultant data, in terms of the data's number of fields. For explanatory purposes each field may be assumed to comprise a single bit. However, as will become apparent from the following description, a field may consist of any number of bits, for example, eight when the resultant data is in alphanumeric form. The number in the limit register is compared in a comparator with the content of a counter, which is incremented each time a resultant data field is produced by the processor. Each data field is assumed to be stored in a multifield resultant data register. The comparator and counter, together with the limit register, comprise the limit hardware.

When the count in the counter matches the number in the limit register, as sensed by the comparator, the latter stops the processing operation in the processor and enables the resultant data in the resultant register to be supplied to whatever unit in the system such data is to be forwarded. Thereafter, the counter is reset, enabling the limit hardware once more to limit the number of resultant data fields from the processor not to exceed the number in the limit register.

The number which is loaded into the limit register may represent a default limit or any desired limit number, supplied to the register's input circuitry. The register's input circuitry may be prewired so that any one of a plurality of load control signals may cause the register to be loaded with a particular preselected number out of a plurality of such numbers. The prewiring arrangement greatly reduces the time needed for register loading, thereby reducing the time required for setting up the length limit of the processor's resultant data.

Although particular embodiments of the invention have been described and illustrated herein, it is recognized that modifications and variations may readily occur to those skilled in the art and consequently it is intended that the claims be interpreted to cover such modifications and equivalents.

3

BRIEF DESCRIPTION OF THE DRAWINGS

FIG. 3 is a detailed block diagram of a limit register, shown in FIG. 2, and associated logic circuitry; and FIG. 4 is a block diagram of another embodiment of the invention.

DESCRIPTION OF THE PREFERRED EMBODIMENTS

Figure 1:
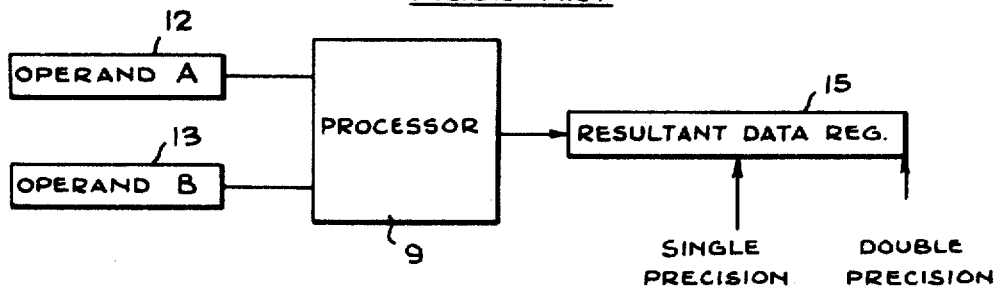
FIG. 1 is a simple diagram useful in summarizing the state of the prior art.

The teachings of the present invention may best be explained and highlighted by first considering the state of the prior art, which may be summarized in conjunction with FIG. 1. Therein, a general purpose arithmetic processor, hereafter simply referred to as a processor, is represented by numeral 9. The processor is assumed to process on two operands, A and B supplied thereto from input registers 12 and 13. The processed or resultant data is loaded into a resultant data register (RDR) 15, from which the resultant data is later unloaded or read out to any desired device or location, hereafter referred to as the utilization unit (not shown) in the computer system, in which such an arrangement is incorporated.

The RDR 15 which is a multifield register, where each field is assumed to be of one or more bits in length, may be of the single or double precision type. The number of fields which are read out is determined by the selected precision. However, for each precision, the number of read out fields is fixed. The disadvantages of such an arrangement have been discussed herebefore.

Figure 2:
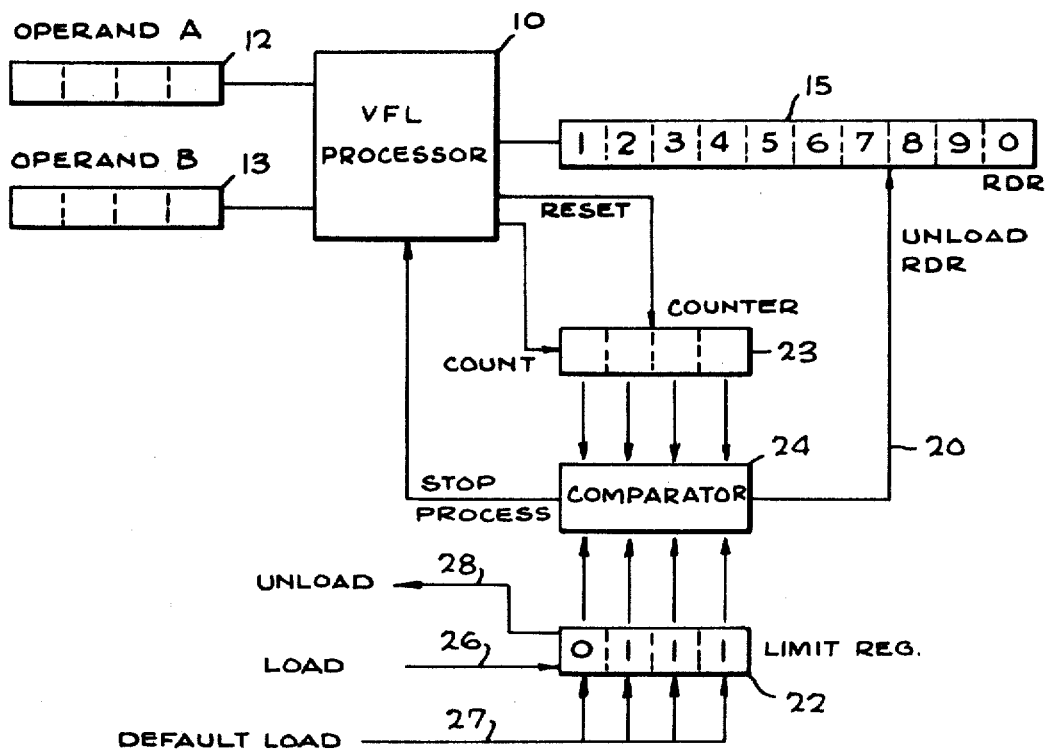
FIG. 2 is a general block diagram of one embodiment of the invention.

Unlike such an arrangement, in accordance with the teachings of the present invention, which may best be explained in connection with FIG. 2, associated with VFL processor 10 and RDR 15 is limit hardware generally designated by numeral 20, which includes a limit register 22, a counter 23 and a comparator 24. Each of the latter-mentioned three circuits comprises a number of bits sufficient to represent the number of fields of RDR 15 in binary form. For the example in which RDR 15 is shown comprising 10 fields, register 22, counter 23 and comparator 24 each comprises 4 bits.

Basically, the limit register 22 is loaded in any one of different ways, as will be explained hereafter, with a number (in binary form) which represents the desired number of fields of the resultant data. As shown, the counter is coupled to the processor 10 so that as each processed field is loaded by the processor 10 in the RDR, the count or number in the counter is incremented by one.

The numbers in the register 22 is compared with the number in counter 23 by comparator 24. When the number in the counter equals the limit number in the limit register 22, an equality which occurs only when the number of processed fields in the RDR equals the limit number, the comparator provides a Stop Process signal to the processor 10 in order to terminate further processing therein. Also, the comparator 24 supplied an Unload signal to the RDR 15 to unload its content, which at this point includes only the desired number of fields, to any utilization unit. After the unloading of RDR 15, the processor automatically resets the counter and starts processing any new operands supplied thereto such as from any sources, such as register 12 and 13.

The limit register 22 may be loaded with a limit number supplied thereto from any desired source. This is represented by arrow 26 labeled "LOAD." For example, the limit number may be supplied to the register 22 via bus lines from a register, such as a data register associated with a memory in which the limit number is stored, in response to an instruction during a processing operation. Preferably, the register 22 may be wired for direct setting, in order to store a fixed preselected number, when accuracy or processing efficiency is not important. In such a case, the limit number may be thought of as having a default limit number to enable the maximum number of fields

4 of RDR 15 to be read out. Such direct loading is represented by arrow 27, labeled "DEFAULT LOAD."

In addition, it is advantageous to be able to unload the number from the limit register 22 and supply it to the processing system, in which the present invention is assumed to be incorporated, as a data variable, which can then be processed and reloaded if desired. The capability of unloading the limit register is represented by arrow 28 labeled "UNLOAD."

FIG. 3 to which reference is made is a simple diagram of the four stage limit register 22 and logic circuitry capable of controlling its loading and unloading from and to a multiline bus, as well as its loading with a default number. Therein the limit register 22 is represented by four flip-flops designated FF1—FF4. Each flip-flop is associated with three AND gates, designated C, D and E followed by the flip-flop's numerical suffix. It should be noted that FIG. 3 assumes a logic family that includes a wired OR capability; i.e., a log OR is accomplished by typing outputs together in a common mode.

The C, D and E gates, associated with each stage, serve as load, default and unload gates respectively. One input of each gate C is connected to a different line of data bus 30, while the other input is connected to a line 26 which corresponds to arrow 26 in FIG. 2. Thus, line 26 may be thought of as a load line which when true, enables the C gates to load or set the flip-flops with the data, on the bus 30. The outputs of the flip-flops are shown supplied to comparator 24. Likewise, the output of each E gate is connected to another line of the bus 30. One input of each E gate is connected to the output of its associated FF and the other output is connected to line 28 which acts as an unload line. Thus, when the latter is true, the contents or states of the flip-flops representing the limit number is unloaded to the bus 30.

The output of each D gate, like the C gate output, is connected to set the associated flip-flop when the D gate output is true. One input of each D gate is connected to a load default line 27, while the other inputs of only selected D gates are connected to a line 32 at which an enabling potential such as +v, representing a binary 1 is applied. When line 27 is true only D gates connected to line 32 are enabled to set their corresponding FF's. As shown only D1 and D3 are connected to line 32, so that a true load default line 27 results in the setting FF1 and FF3. Thus, the four FF's represent the number 10 in the binary form 1010. The register may further include a reset or clock line 33 for resetting or clocking the four flip-flops, FF1—FF4.

The manner in which the present invention in a multiprocessor system, and the advantages realizable therefrom may best be explained and summarized in conjunction with FIG. 4, wherein numeral 40 designates a memory. Numerals 41 and 42 designate a memory address register (MAR) and a memory data register (MDR) which are associated with memory 40. Data bus 30 connects the MDR to the processor system while an address bus 45 connects the system to the MAR.

The memory 40 is assumed to be divided into multicell storage areas, each area being used to store all the data or words associated with a different job. Each area is assumed to include at least one addressable cell, or simply an address in which a limit word, representing a limit number is storable. In FIG. 4 the areas for jobs 1–$n$ are shown including a cell X1–X$n$, each cell storing a limit word 1, designated LW1.

As is appreciated by those familiar with the art, any cell in any storage area may be accessible to store a word or retrieve one therefrom, by supplying the cell address to the MAR. A word supplied to the MDR is stored in the address in the MAR, while during retrieval or readout the MDR is supplied by the memory with the word located at the address in the MAR.

In accordance with the teachings of the present invention, the data bus 30 is coupled to the limit register 22 through the load gates C, as shown in FIG. 3, so that any load number which may be read out from the memory 40 and loaded in the MDR 42 may be loaded into the register 22. Likewise, the Unload gates E are connected to the MDR 42 via data bus 30, so that any number in the limit register 22 may be transferred to the MDR for storage in memory 40.

From the foregoing it should thus be appreciated that by supplying the memory 40 with the address of any of the cells X1–Xn, the limit word loaded therein may be read out and loaded into the limit register 22 or reloaded into the memory in one memory cycle.

Typically, the memory system may include a special purpose limit address generator designated by numeral 51. The function of this generator, when enabled, is to provide the specific address of the X cell within each storage area, the address of which may be provided by the MAR 41 in response to signals from the processing system. This eliminates the need to load the MAR 41 with the full address of an X cell from an exterior source. Thus, whenever any processor operates for any given job, such as job 02, and words are read out from the job 02 storage area or stored therein, the specific limit number may be read out from X2 and loaded in the limit register by merely enabling generator 51 and load gates C.

Preferably each storage area may include an additional cell designated Y, for storing an additional limit number, designated limit word 2, or LW2. In such an embodiment an additional limit address generator 2 represented by block 52 is incorporated. Thus, by enabling either register 51 or register 52 either of the two limit numbers for each job can be speedily loaded into the limit register 22. The inclusion of more than one limit number enables the system to process data for any job number with different limit numbers, thus producing resultant data with different degrees of accuracy.

Furthermore, the system may include a default number located in memory 40 at a specific address which a special purpose default limit address generator 53 is capable of generating. Thus, by generating such an address, the special default number may be loaded into the limit register through LOAD gates C, which in FIG. 4 are shown connected to the data bus 30. Such a number may be used for system initializing or check out purposes.

From the foregoing it should thus be appreciated that in accordance with the present invention the limit number for each job processed may be accessed from a known address (such as the X address) and loaded into the limit register as a processing job is started. The accessing of the number is similar to the accessing of any other word for the particular job. At the conclusion of the processing, the number may be restored in the job's storage area at its designated location. By this technique the same processor may be supplied with different limit numbers when processing data for different jobs.

Furthermore, during processing the limit value may be varied by accessing the value from the limit register 22 by the UNLOAD gates E, processing the accessed value, and restoring the new limit value into the limit register 22 by the LOAD gates C.

Also, for the same job any one of several limit numbers are available for supply to the processor. Clearly such an arrangement enables one to process data from any job with different limit numbers to determine the optimum limit number needed for a desired degree of accuracy of the resultant data. The limit hardware, herebefore described, enables one to achieve all the aforementioned advantageous capabilities in a minimum of computer time, generally in the order of not more than several memory cycles. This represents a major advantage in any computer system, particularly in a time-shared multiprocessor system, in which the present invention finds particular application.

Although particular embodiments of the invention have been described and illustrated herein, it is recognized that modifications and variations may readily occur to those skilled in the art and consequently it is intended that the claims be interpreted to cover such modifications and equivalents.

We claim:

1. In a data processing system of the type including a data processor which is suppliable with data to be processed therein to provide resultant data therefrom, the resultant data comprising at least one field, a circuit arrangement comprising:

a data processor for processing data supplied thereto and for providing resultant data comprising at least one resultant data field;

processor output means for receiving each resultant data field from said processor;

counting means coupled to said processor output means for counting the number of resultant data fields which are received thereby;

limit register means for storing a number representing a desired number of fields of said resultant data;

a memory comprising a plurality of addressable storage locations, memory address and memory data registers, said memory including at least one limit number address generator for providing the address in said memory of a selected limit number and means for activating said limit number address register to provide the address in said memory at which said selected limit number is stored to read out said number into said data register for subsequent supply to said limit register means;

bus means for coupling said limit register means to said memory data register to enable the transfer of a number from said data register to said limit register means for use in limiting the number of fields of resultant data produced by the processor with which said limit register means is associated; and comparing means to which said counting means and said limit register means are connected for limiting the number of fields of resultant data supplied by said processor to said processor output means to equal the number in said limit register means.

2. A data processing system as described in claim 1 wherein said comparing means are coupled to said processor for inhibiting the processing in said processor when the count from said counting means and the number in said limit register means which are supplied to said comparing means are equal.